(12) United States Patent
Bullman et al.

(10) Patent No.: US 7,912,937 B2
(45) Date of Patent: Mar. 22, 2011

(54) REMOTE MANAGEMENT AND ANALYSIS TECHNIQUES IN HOME PHONELINE NETWORKS

(75) Inventors: William R. Bullman, Macungie, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 2726 days.

(21) Appl. No.: 10/218,510

(22) Filed: Aug. 15, 2002

(65) Prior Publication Data

US 2003/0037292 A1 Feb. 20, 2003

Related U.S. Application Data

(60) Provisional application No. 60/313,195, filed on Aug. 17, 2001.

(51) Int. Cl.
*G06F 15/173* (2006.01)
*H04M 1/24* (2006.01)
(52) U.S. Cl. ............... 709/224; 709/223; 379/106.06
(58) Field of Classification Search .......... 709/223–224; 379/106.03, 106.06, 106.08; 714/712, 717
See application file for complete search history.

(56) References Cited

U.S. PATENT DOCUMENTS

| 4,241,237 | A | * | 12/1980 | Paraskevakos et al. | .. 379/106.06 |
| 5,463,632 | A | * | 10/1995 | Tremblay | ...................... 714/712 |
| 6,859,828 | B1 | * | 2/2005 | Morgan et al. | ................ 709/224 |

OTHER PUBLICATIONS

Stan Gibilisco, The Illustrated Dictionary of Electronics 415 (8th ed. 2001).*

* cited by examiner

*Primary Examiner* — Peling A Shaw

(57) ABSTRACT

Remote analysis method and system for Home Phoneline Networks (HPNs), i.e., local area networks made up of telephone wiring in residential premises. In such a network connected to the Internet, a host computer collects measurements of the frequency response of the local network as well as values of addresses and other important network parameters of devices also located on the local network. The results of this data collection, having been sent via the Internet, may be displayed within a web browser on a remote computer external to the local network in a web. This data can then be monitored conveniently by a service technician or the like at any location.

20 Claims, 4 Drawing Sheets

REMOTE MANAGEMENT AND ANALYSIS TECHNIQUES IN HOME PHONELINE NETWORKS

This application claims priority from U.S. Provisional Application No. 60/313,195 filed Aug. 17, 2001, entitled "Remote Management and Analysis Techniques in Home Phoneline Networks", the entirety of which is expressly incorporated herein by reference.

BACKGROUND OF THE INVENTION

1. Field of the Invention

The invention relates to remote management and analysis techniques for networks. More particularly, the invention relates to such techniques for local area networks constructed from home telephone wiring.

2. Background

Home Networking is a new segment of the networking marketplace that is poised for rapid growth. It is extremely important to consider that the emerging "in-home" networking technology is being targeted as a consumer grade service. As such any design goals must consider the "technology challenged" consumer and requires "out of the box" functionality. In the case of "in-home" networking via the existing telephone cable (HPN) the expectation from the consumer simply is that the technology functions properly and requires little more than installing a (provided) cable into an available telephone jack in the home. Further, it is expected that the technology provides a path to install the upper level protocols and drivers with no network configuration required by the consumer. This model obviously assumes that no "truck roll" occurs, and that there is no need for a qualified service personnel to come into the home.

Success in the consumer market requires that a home networking technology be inexpensive, easy to install, and easy to use. To be truly effective and embraced by consumers, a home networking solution must meet these criteria:

No new wiring must be needed. Most existing homes are not wired for traditional networking equipment It must be simple to install and use It must be low cost to allow the mass market to enjoy the benefits of home networking It must have adequate range to operate within a typical home It must support high speed data rates The networking capability must grow with user applications without rendering existing devices obsolete The network must be secure. The network data must remain private; it must not be accessible to neighbors or anyone outside the home.

To achieve these goals the ability to offer robust products under extremely challenging "in-home" wiring topologies is absolutely critical.

The Home Phoneline Networking Alliance ("HomePNA™") 1.0 and 2.0 specifications use a PSD mask that extends from 4 to 10 MHz. HPN signals are imposed on the existing telephone wiring inside a dwelling or office, and are used for local communication between HPN stations. The same inside telephone wiring may simultaneously carry POTS, ISDN or ADSL services since the HPNA signals occupy spectrum that is higher in frequency than any of those services. Assume a system sharing the phoneline media in a Frequency Division Multiplexed (FDM) topology as shown in FIG. 1. In this arrangement Plain Old Telephone Service (POTS) exists in the 0-4 kHz region, the xDSL service is present from 25 kHz to approximately 1.1 MHz (depending on the definition of "x"), and the HPN spectrum occupies 5.5-9.5 MHz for HomePNA Version 1.x technology and 4.75-9.25 MHz for HomePNA Version 2 technology. The spectral allocation for the VDSL services is not yet established but it is expected to use the 26 kHz to 10 MHz region.

This advantage is important because it is anticipated that due to the cost effectiveness of HPN solutions multiple devices in consumer space will become linked to desired high speed home networked devices and computers for the purposes of automation and data sharing.

Several factors need to be considered when investigating the design challenges of networking within the home environment over the existing copper plant. These challenges include exploring the areas of the "in-premises" wiring environment, understanding the telephone wiring topologies used in "typical" homes, modeling the interference and channel impairments in the existing copper plant, and understanding the spectral compatibility issues of sharing the media with existing services such as telephones, answering machines, baseband modems, and emerging high speed digital modems (xDSL).

Home phoneline networking presents the following challenges:

Must tolerate completely random and unspecified wiring topologies. The telephone wiring structure within each home is unknown and even changes on a day to day basis. For example, a simple action like plugging in a telephone or fax machine will add a branch onto the phoneline wiring tree.

Must be designed to take into consideration the unknown but typically large degree of signal attenuation which occurs within the random tree network topology A transmitted pulse is attenuated and scattered on the wires as it traverses the wiring. The longer the pulse travels through the wire, the more the signal is attenuated. This effect is compounded by impedance mismatches and lack of termination.

Must be able to tolerate high and varying levels of signal noise. Appliances, heaters, air conditioners, consumer appliances, and telephones all add random and varying levels of signal noise onto the phone wires.

Must be able to tolerate the dynamically changing transmission line characteristics. Telephones and other phoneline devices have a wide range of dynamically changing operating characteristics which, if the network is not properly designed, can interfere with data transmission. The simple act of a user picking up a telephone can dramatically change the data transmission characteristics of the phone wiring. Conversely, without care, data transmissions might interfere with the proper operation of telephones and fax machines.

Must he able to coexist with telephone service and comply with regulatory initiatives such as FCC Parts 15 and 68. Phoneline network solutions are constrained to use signals with low energy levels, which further complicates the task of establishing adequate signal-to-noise ratios.

And, finally, must maximize data throughput given the above constraints and limitations.

Achieving the goals needed to make home networking a success is clearly a challenging task. Various environmental factors lead to potential compromising of robustness and sacrificing data throughput of "in-home" networks. The harsh environment does not leave room for compromising the robustness of home networking technology if a trouble-free consumer experience is desired.

The home networking market growth will depend on the emergence of high-speed broadband access as a catalyst as well as availability of robust, low cost, easy to install standardized home networking equipment. Technical analysis has demonstrated that there is little system margin available for achieving the desired rates and robustness if a trouble-free consumer experience is desired.

In a consumer-grade service offering, such as the Home Networking market, it must be assumed that the consumer neither understands nor has the capability to diagnose and remediate problems in networking systems. When problems do arise the consumer typically places a call to a call-center where a "qualified" attendant is available to assist in problem diagnosis and remediation. This is a costly model and minimizing the call-center time is absolutely critical. To properly accomplish this task the call-center attendant often needs to gain insight into the consumer system.

User applications that allow information on a per vendor/Network Interface Card (NIC) basis are generally available but on a very limited basis. However, these interface application programs are not consistent and will not operate with other vendor offerings that may be on the network. Further, these tools to date have been provided for on-site network management personnel that are skilled in the art of network management. Residential applications, however, are consumer focused. Generally, these consumers have little or no prior network management experience. Further, the design challenges of networking within the home environment over the existing copper plant present new issues that to date have not been encountered nor considered by the industry.

SUMMARY OF THE INVENTION

Several diagnostic tools can be considered that, as a primary goal, support the consumer's ability to self diagnose the existing problem and remediate. When self-diagnosis is not possible nonintrusive diagnosis tools can be designed that expose system parameters of the consumer system for remote analysis by qualified personnel. As home networking is a segment of the networking marketplace that is poised for rapid growth, achieving the goals needed to make home networking a market success is a challenging task. To enrich the consumer experience it is critical to consider mechanisms in the system that can be employed to support simple to use remote diagnostic tools in these emerging systems. This invention explores several novel concepts that could be considered in the design of these emerging "in-home" networking systems.

This invention relates to the technical challenges of "in-home" Phoneline Technology and explores novel concepts in the area of remote diagnostics and management of "in-home networking" by qualified personnel should problems arise. The ability of HPN Systems to support spectral analysis of the in-home network as well as characterization of other important networking elements which allow remote analysis by qualified service technician to gain insight into the customer in-home wire plant, are explored. Armed with this analysis technique potential remediation efforts can be provided remotely thereby minimizing costs to the supplier and at the same time offer fairly non-intrusive remediation measures for the customer.

In such a network connected to the Internet via DSL, measurements of the frequency response of the network and values of addresses on the network are sent to a host computer via the Internet to be processed, and the results of processing may be displayed on a remote computer in a web browser via the Internet, to be monitored conveniently by a service technician or the like at any location.

Using Digital Signal Processing (DSP)-based techniques, the solutions described herein can be implemented with relative ease.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

As previously noted, the call-center attendant often needs to gain insight into the consumer system. To that end several diagnostic tools can be considered that, as a primary goal, support the consumers ability to self diagnose the existing problem and remediate. When self-diagnosis is not possible non-intrusive diagnosis tools can be designed that expose system parameters of the consumer system for remote analysis by qualified personnel.

The major problem associated with consumer deployment of HPN terminals is that the home has a completely random and unspecified wiring topology. Further, unknown but typically large, degrees of signal attenuation due to uncharacterized in-home wiring can cause a transmitted pulse to become attenuated and scattered on the wires as it traverses the wiring. The further the pulse travels through the wire, the more the signal is attenuated. This effect is compounded by impedance mismatches and lack of termination that cause spectral nulls in the HPN signal passband. These nulls typically lead to a performance degradation that can be anywhere from a slight degradation to making the network completely unusable in the opposite extreme.

The ability to directly take samples from the line and pass them along to the host processing element for offline processing is a very valuable tool. This technique will in effect provide a "built-in" system spectrum analyzer that in the case of HPN Systems will allow spectral analyses and plots to be generated of the in-home network. Further, a complete characterization of noise and other potential elements that lead to system degradation can be performed. Such analysis techniques will allow a qualified service technician to gain insight into the customer in-home wire plant. Armed with this analysis technique potential remediation efforts can be provided remotely thereby minimizing costs to the supplier and at the same time offer fairly non-intrusive remediation measures for the customer. Using Digital Signal Processing (DSP)-based techniques, the solution described herein can be implemented with relative ease.

Figure 1:
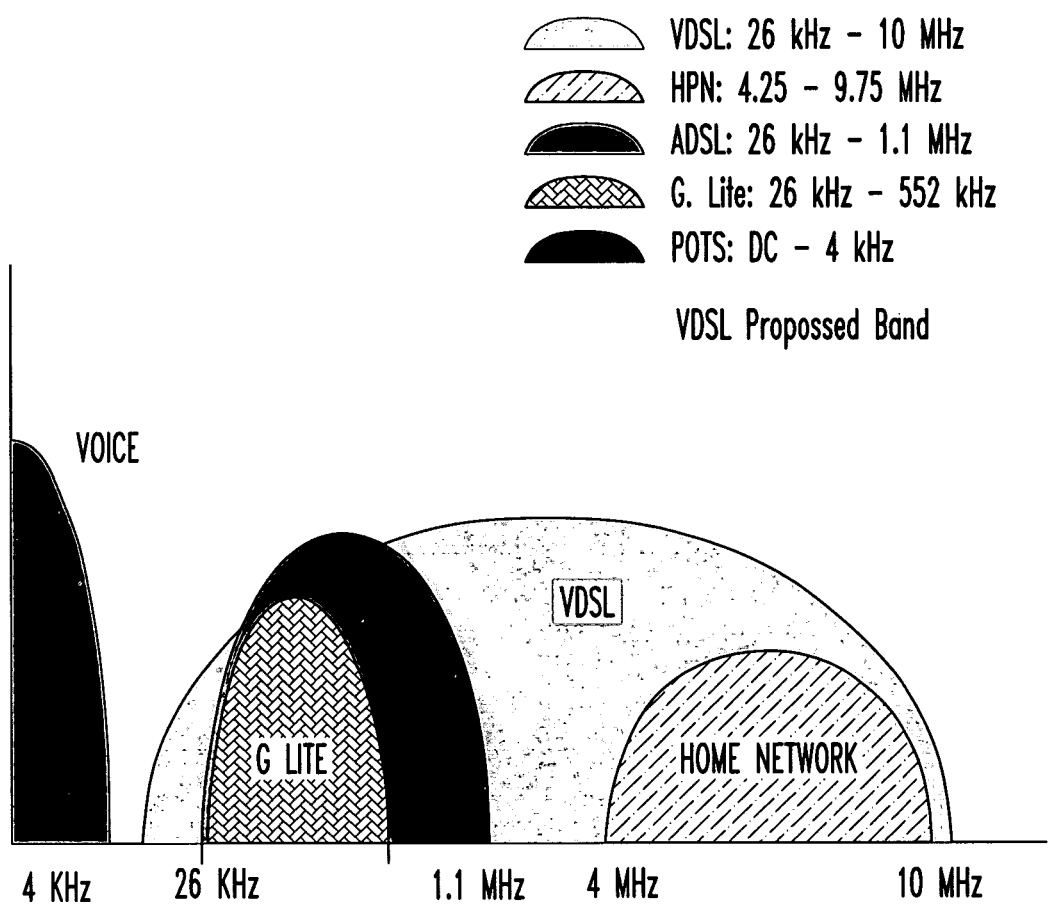
FIG. 1 shows the spectral allocation of existing services sharing telephone line media.
Figure 2:
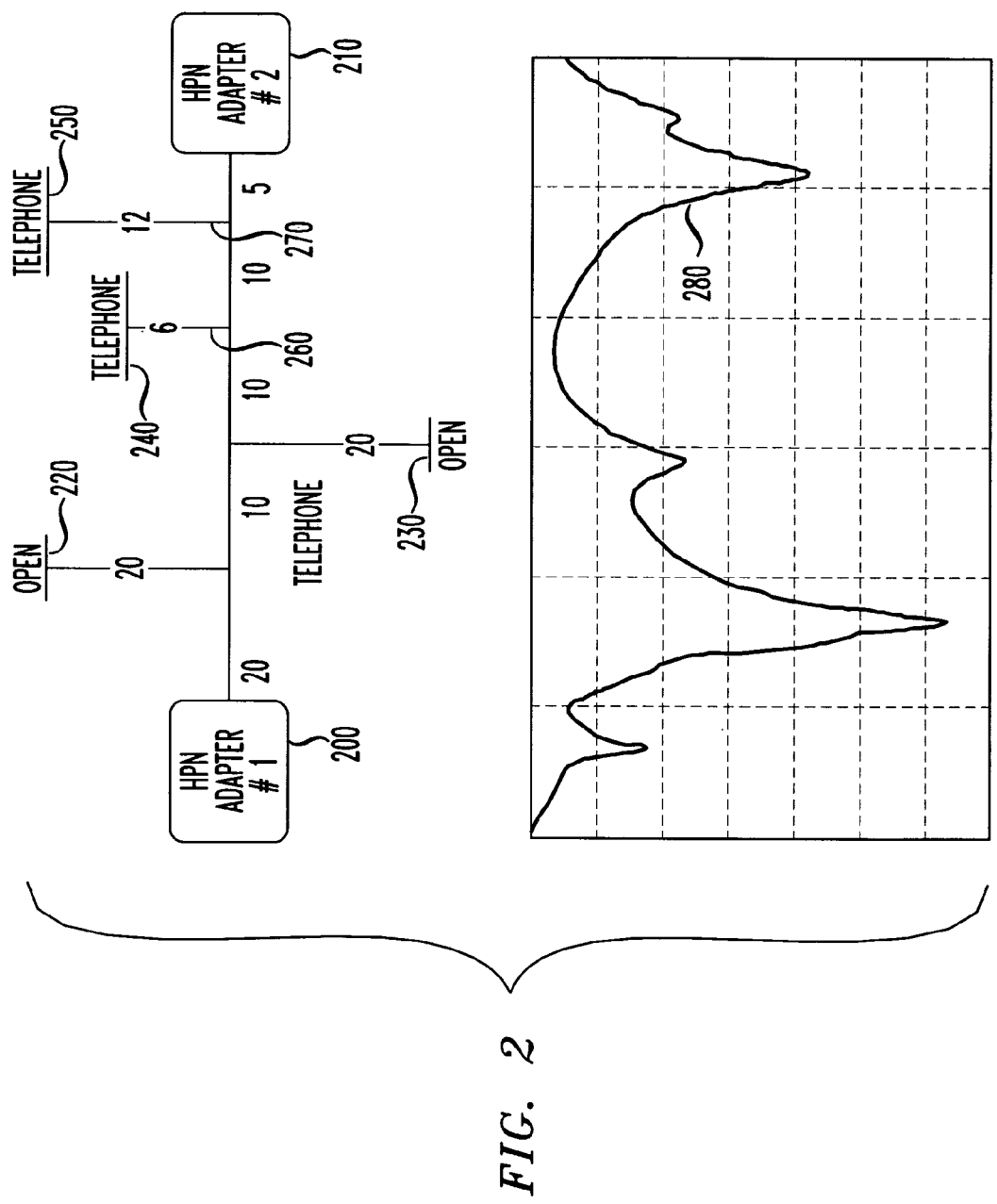
FIG. 2 shows an example network and its frequency response.
Figure 3:
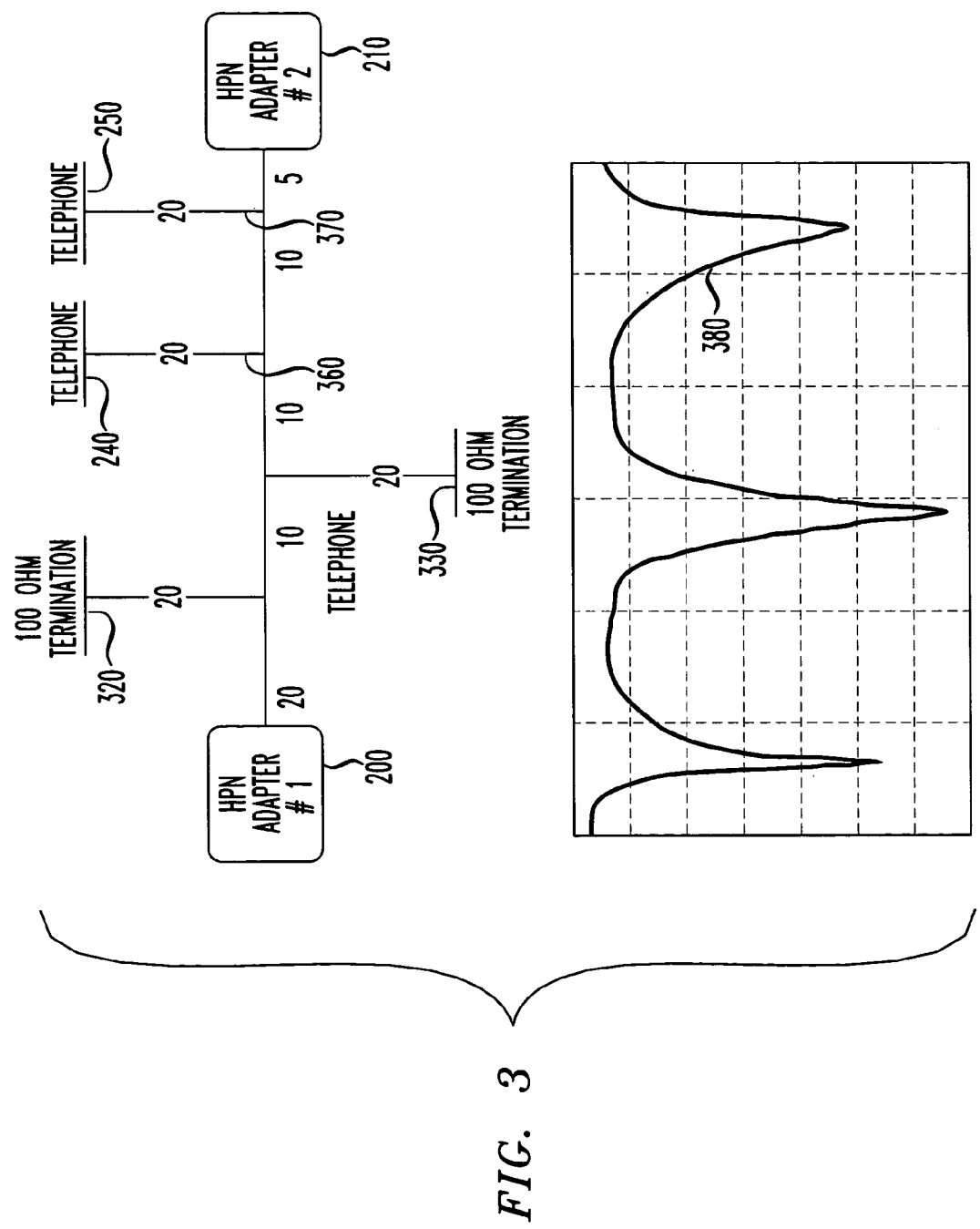
FIG. 3 shows a remediated network and its frequency response.

As an example consider the network and the frequency response 280 depicted in FIG. 2. In this network a very deep spectral null in the 4-10 MHz passband severely degrades the ability of the HPN system to pass data. It is assumed that a minimum of 40 dB Signal/Noise Ratio is required for communication. In this example network, in addition to HPN adapters 200 and 210, there are two nodes 220 and 230 that are completely unterminated, and a pair of telephones 240 and 250 also reside on the network. However, with the inclusion of termination elements 320 and 330, and by additionally replacing the 6 and 12 foot pieces of interconnect cable 260 and 270 with 20 foot pieces of interconnect cable 360 and 370 as shown in FIG. 3 the network throughput is greatly enhanced as the spectral null has been "softened" and effectively moved outside the HPN passband (4-10 MHz region), as can be seen by comparing the frequency response 380 of FIG. 3 with the frequency response 280 of FIG. 2. This type of analysis can be provided if the appropriate data is made available to qualified service personnel.

This characterization technique is especially powerful if one considers and builds systems that do not include filters that are typically present in HPN systems to band-limit and isolate energy into the HomePNA-defined 4-10 MHz region to gather information on the system environment. These filters are placed into the system to control signal egress into and to prevent signal ingress from other systems potentially sharing the media. By removing these filtering networks one could gain insight into the entire spectrum from DC to the frequency of interest. Of course, such filters are likely to be required during normal system operation.

xDSL modems are being shipped today that are dual mode devices which support both xDSL as well as baseband modem functions. In systems that are multi-function attribute systems—i.e. systems containing both HPN and xDSL within the same system—the task of spectral analysis can be possibly "split". This "split" technique may be easier from an implementation perspective and would allow the analysis of frequencies from DC through the HPN band.

Another area of major concern is with network management. Most consumers will not know how to setup and configure network parameters in order to maximize system operation. Information can be collected on the system that can further aid call center personnel in problem isolation. Elements such as number of stations, IP and MAC addresses, terminal attributes, negotiated rates, mounted drives and peripheral, shared resources, etc., can be collected.

Due to the ubiquity of the wide area network known as the Internet these off-line analysis results can be made readily and quickly available to call center personnel. This further aids in streamlining customer support problem resolution. If these interface application programs were to be defined and employed within an industry specification or standard the data collected would be consistent and therefore would support multi-vendor offerings that may be on the network. Further, if important data parameters were agreed and a consistent method for collecting that data was provided within an industry specification or standard the ability to support simple to use remote diagnostic tools in these emerging systems, which is absolutely critical to enrich the consumer experience, becomes an easier problem to resolve.

Figure 4:
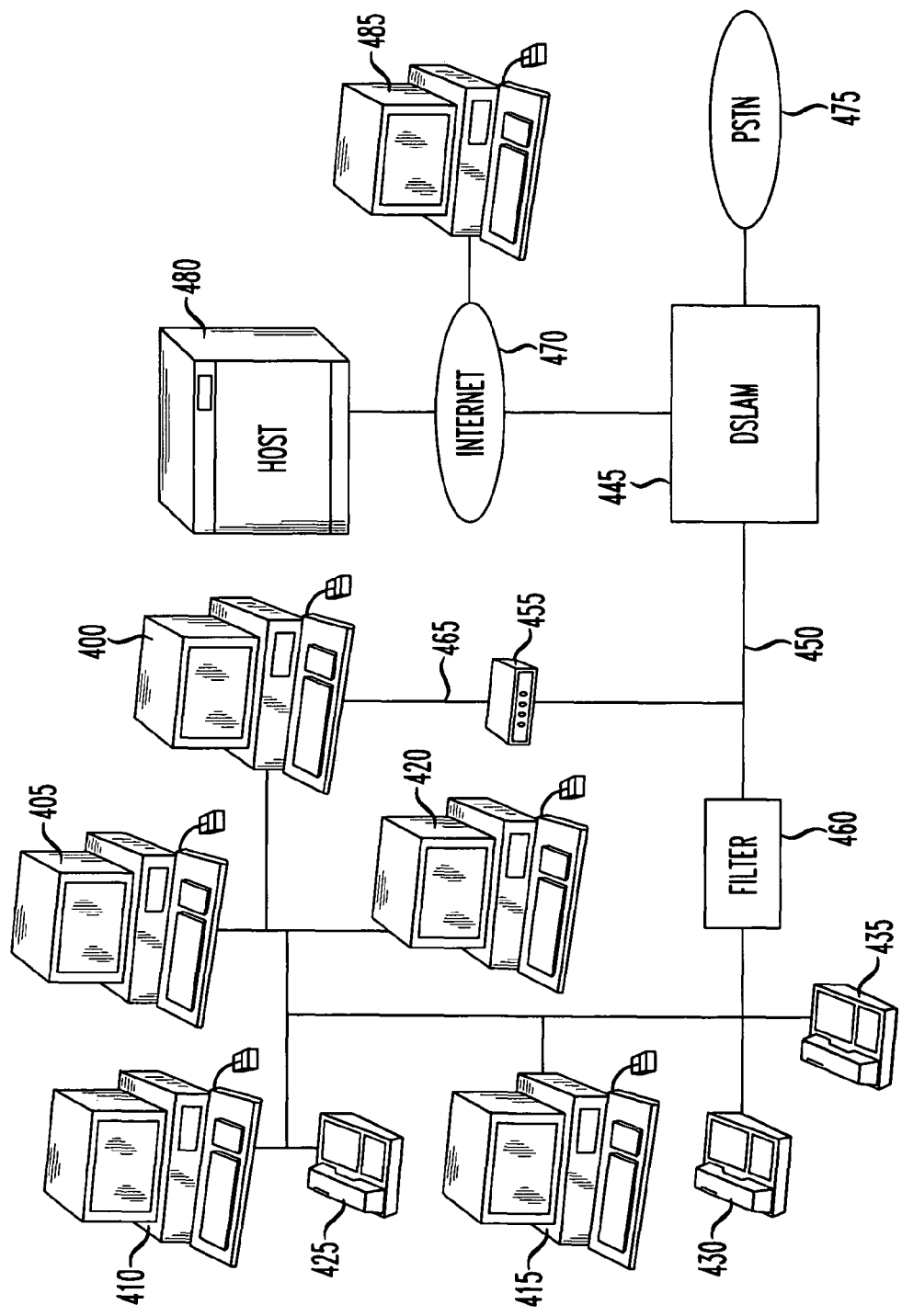
FIG. 4 shows an example of a system according to an embodiment of the invention.

A non-limiting example of an arrangement according to the invention will now be described in more detail with reference to FIG. 4. The Home Phoneline Network (HPN) shown includes a number of computers 400, 405, 410, 415 and 420, each connected to telephone wiring 440 via an HPN adapter (not shown). In addition, items of telephone equipment such as telephones 425, 430 and 435 are also connected to the same telephone wiring 440. It will be appreciated that the telephones shown in the drawing may represent any telephone equipment that may be connected to the telephone line, such as facsimile machines or dial-up modems. Similarly, although this is not shown, a peripheral such as a printer may also be connected to telephone wiring 440 by an HPN adapter, or otherwise connected via one of the computers 400, 405, and 410, 415 or 420.

A Digital Subscriber Line Access Multiplexer (DSLAM) 445 is located in the telephone company's Central Office and connected both to the Public Switched Telephone Network (PSTN) 475 and via the subscriber's ISP (Internet Service Provider) (not shown) to the Internet 470. The DSL line 450 from the telephone company to the subscriber premises therefore carries both the high frequency DSL data and the low frequency POTS (Plain Old Telephone Service).

In the subscriber premises, the DSL line 450 is connected both to DSL modem 455 and to a filter 460. The filter 460 removes the high frequency DSL information and allows the low frequency POTS to pass to and from the internal telephone wiring 440, whereas only the high frequency data passes between computer 400 and the DSL modem 455 on data line 465. In the particular arrangement shown, the computer 400 acts as a gateway between the DSL modem 455 and the other computers 405, 410, 415 and 420 in the network. It will be appreciated by those skilled in the art that there are many other ways in which the network may be connected to the DSL modem 455, such as by way of a hardware router.

The frequency spectrum measurements of the invention may be made in the computer 400. The measurements may also be made by any other computer or device connected to the network. Similarly, any computer device connected to the work may gather the addresses of devices connected to the network. Any combination of hardware, firmware and/or software may be employed to make these measurements. This information is then passed back through the DSL modem 455 and over the Internet 470 to a host computer 480, where the information is processed. The processed results from the host computer 480 may then be made available over the Internet 470 to a remote computer 485 at any location, where a technician may read the frequency spectrum and network data, for example by using a web browser.

The invention may be used in commercial products or other applications in which Home Phoneline (HomePNA) Home Networking terminal endpoints implement off-line analysis tools, all Networking devices that share a physical medium offering off-line analysis tools-xDSL, HPN, baseband modem systems, networked devices that allow system data collection for the purposes of network characterization to be taken non-intrusively, and HPN terminals that support spectrum analysis techniques for remote analysis.

While the invention has been described with reference to the exemplary embodiments thereof, those skilled in the art will be able to make various modifications to the described embodiments of the invention without departing from the true spirit and scope of the invention.

What is claimed is:

1. A method of remotely analyzing a local area network, comprising:
   measuring at least one parameter of said local area network at a selected node in said local area network;
   sending a digital signal representing said at least one parameter from said selected node to a remote host;
   processing said signal at said host; and
   displaying a result of said step of processing said signal.

2. The method of remotely analyzing a local area network according to claim 1, wherein:
   said at least one parameter comprises a frequency response of said local area network.

3. The method of remotely analyzing a local area network according to claim 2, wherein:
   said at least one parameter comprises an address of at least one node in said local area network.

4. The method of remotely analyzing a local area network according to claim 1, wherein:

said at least one parameter comprises an address of at least one node in said local area network.

5. The method of remotely analyzing a local area network according to claim 1, wherein:
said result is displayed at a remote computer remotely located in relation to said host and connected to said host via a wide area network.

6. The method of remotely analyzing a local area network according to claim 1, wherein:
said local area network comprises telephone conductors within a customer premises.

7. The method of remotely analyzing a local area network according to claim 6, wherein:
said at least one parameter comprises a frequency response of said local area network.

8. The method of remotely analyzing a local area network according to claim 7, wherein:
said at least one parameter comprises an address of at least one node in said local area network.

9. The method of remotely analyzing a local area network according to claim 6, wherein:
said at least one parameter comprises an address of at least one node in said local area network.

10. The method of remotely analyzing a local area network according to claim 6, wherein:
said result is displayed at a remote computer remotely located in relation to said host and connected to said host via a wide area network.

11. Apparatus for remotely analyzing a local area network, comprising:
means for measuring at least one parameter of said local area network at a selected node in said local area network;
means for sending a digital signal representing said at least one parameter from said selected node to a remote host;
means for processing said signal at said host; and
means for displaying a result of processing said signal.

12. Apparatus for remotely analyzing a local area network according to claim 11, wherein:
said at least one parameter comprises a frequency response of said local area network.

13. Apparatus for remotely analyzing a local area network according to claim 12, wherein:
said at least one parameter comprises an address of at least one node in said local area network.

14. Apparatus for remotely analyzing a local area network according to claim 11, wherein:
said at least one parameter comprises an address of at least one node in said local area network.

15. Apparatus for remotely analyzing a local area network according to claim 11, wherein:
said result is displayed at a remote computer remotely located in relation to said host and connected to said host via a wide area network.

16. Apparatus for remotely analyzing a local area network according to claim 11, wherein:
said local area network comprises telephone conductors within a customer premises.

17. Apparatus for remotely analyzing a local area network according to claim 16, wherein:
said at least one parameter comprises a frequency response of said local area network.

18. Apparatus for remotely analyzing a local area network according to claim 17, wherein:
said at least one parameter comprises an address of at least one node in said local area network.

19. Apparatus for remotely analyzing a local area network according to claim 16, wherein:
said at least one parameter comprises an address of at least one node in said local area network.

20. Apparatus for remotely analyzing a local area network according to claim 16, wherein:
said result is displayed at a remote computer remotely located in relation to said host and connected to said host via a wide area network.

* * * * *